United States Patent
Hamane

(10) Patent No.: US 8,511,270 B2
(45) Date of Patent: Aug. 20, 2013

(54) CONTROL OF IDLE-STOP OPERATION

(75) Inventor: Shouta Hamane, Chigasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 247 days.

(21) Appl. No.: 13/013,151

(22) Filed: Jan. 25, 2011

(65) Prior Publication Data

US 2011/0180031 A1    Jul. 28, 2011

(30) Foreign Application Priority Data

Jan. 27, 2010  (JP) .................................. 2010-15177

(51) Int. Cl.
*F02N 11/08* (2006.01)
(52) U.S. Cl.
USPC ....................................................... 123/179.4
(58) Field of Classification Search
USPC ............................. 123/179.3, 179.4; 701/113
See application file for complete search history.

(56) References Cited

U.S. PATENT DOCUMENTS

| | | | |
|---|---|---|---|
| 7,267,090 B2 * | 9/2007 | Tamai et al. ................ | 123/179.3 |
| 2003/0089326 A1 * | 5/2003 | Ujifusa ....................... | 123/179.4 |
| 2006/0091848 A1 | 5/2006 | Braun et al. | |
| 2010/0269776 A1 * | 10/2010 | Mizuno ...................... | 123/179.4 |
| 2011/0196570 A1 * | 8/2011 | Nakamura .................. | 701/29 |

FOREIGN PATENT DOCUMENTS

| | | |
|---|---|---|
| EP | 1 079 496 A2 | 2/2001 |
| EP | 1 464 545 A2 | 10/2004 |
| EP | 1 567 877 | 8/2005 |
| EP | 1 983 189 A1 | 10/2008 |
| EP | 1 992 815 A2 | 11/2008 |
| JP | 2004-251234 A | 9/2004 |
| JP | 2006-328965 A | 12/2006 |
| JP | 2008-82275 A | 4/2008 |
| JP | 2008-223564 A | 9/2008 |
| JP | 2009-013953 A | 1/2009 |
| WO | WO 2004051295 A1 | 6/2004 |

OTHER PUBLICATIONS

Machine translation of JP 2009-013953.*

* cited by examiner

*Primary Examiner* — Stephen K Cronin
*Assistant Examiner* — Arnold Castro
(74) *Attorney, Agent, or Firm* — Foley & Lardner LLP

(57) ABSTRACT

An ECM 2 performs an idle-stop operation on a vehicle internal combustion engine 4 in an idle operation state. The ECM 2 is supplied with power from a battery 3. The ECM 2 restarts the internal combustion engine 4 upon request by supplying power from the battery 3 to the starter motor 5. The ECM 2 is programmed to determine if the ECM 2 has experienced an unexpected restart during an engine start-up operation (S1, S2), and prevent the idle-stop operation from being executed on the internal combustion engine 4 when the determination is affirmative. Thus, starting failure of the internal combustion engine 4 from an operation-ceased state can be prevented without preventing the idle-stop operation from being executed excessively.

8 Claims, 4 Drawing Sheets

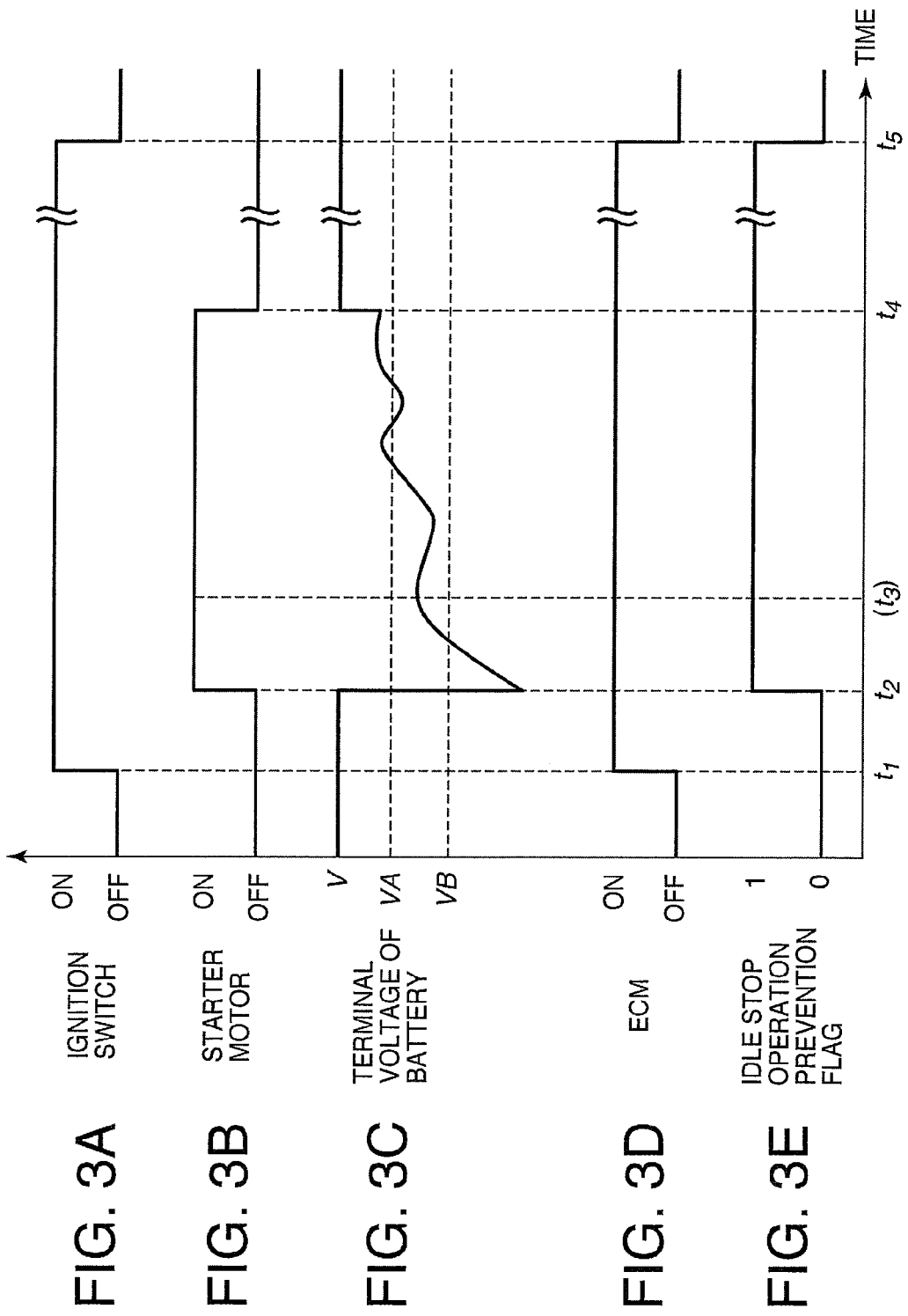

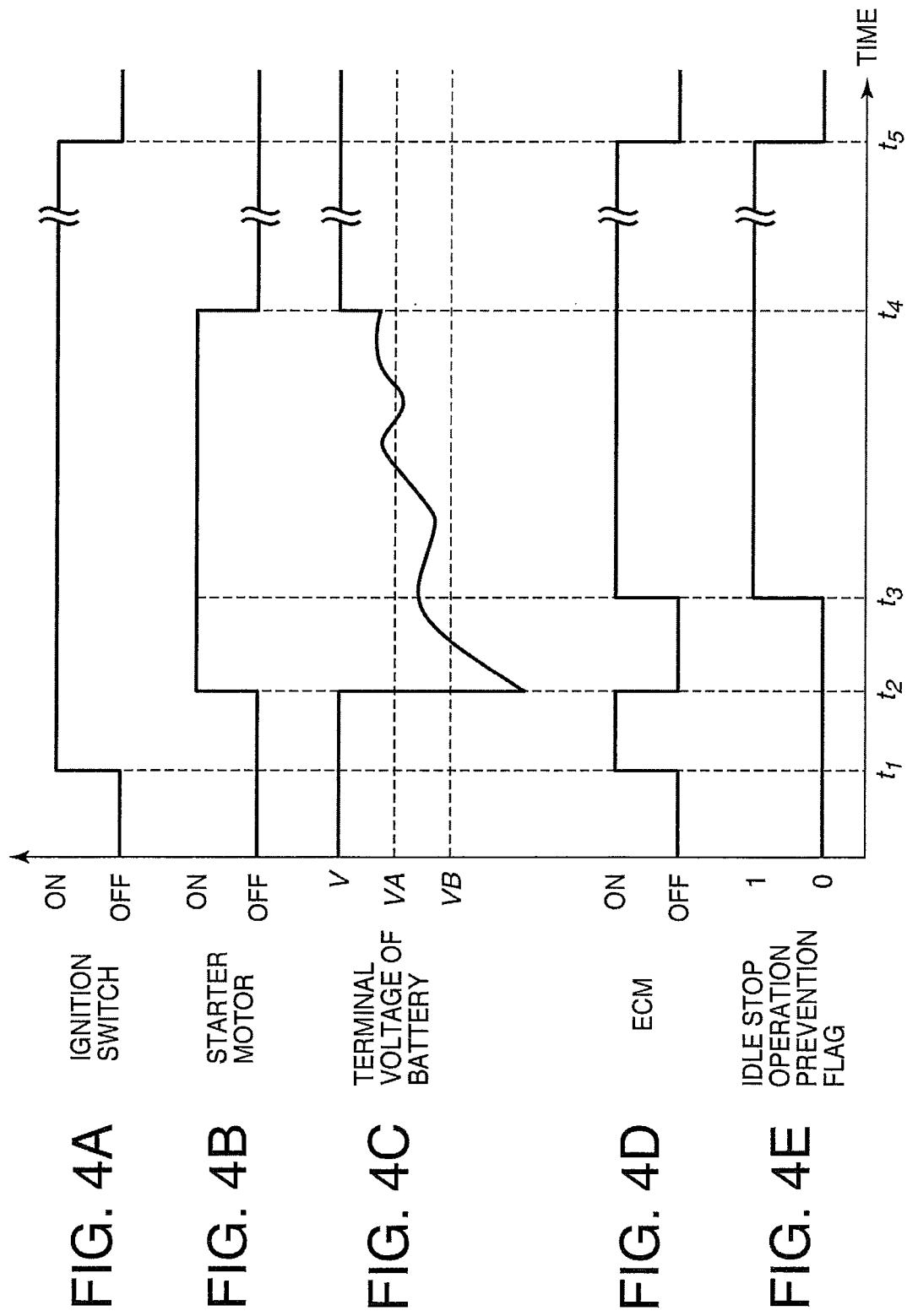

CONTROL OF IDLE-STOP OPERATION

FIELD OF THE INVENTION

This invention relates to idle-stop operation control of a vehicle internal combustion engine.

BACKGROUND OF THE INVENTION

An Engine Control Module (ECM) for controlling an operation of a vehicle internal combustion engine and a starter motor for starting an operation of the internal combustion engine operate using power from a battery mounted on the vehicle. When the starter motor cranks the internal combustion engine in a state where the battery is deteriorated, a terminal voltage of the battery drops greatly due to power consumption by the starter motor. When this voltage drop is notable, the ECM shuts down instantaneously and restarts.

In a vehicle in which an idle-stop operation, i.e., ceasing an operation of the internal combustion engine when it is running idle and the vehicle is in a stationary state, is performed on the internal combustion engine, an unexpected restart of the ECM during an engine start-up may result in an engine start-up failure. Even if the internal combustion engine could be restarted on this occasion, it is unlikely that the internal combustion engine could be restarted with stability following a subsequent idle-stop operation.

In this context, JP2009-013953A, issued by the Japan Patent Office in 2009, proposes setting a voltage level that may cause an ECM to restart as a reset level in advance, and preventing idle-stop operation control of an internal combustion engine when a terminal voltage of a battery falls below the reset level.

SUMMARY OF THE INVENTION

The ECM does not necessarily restart at a constant voltage level. It may restart at a higher voltage than the reset level in connection with other conditions. Setting the reset level at a higher voltage may help in ensuring that an engine start-up failure never occurs, However, if the reset level is set at a higher voltage, the probability of the battery voltage becoming lower than the reset level increases, and as a result, an idle-stop operation may be prevented frequently even when the ECM does not undergo an unexpected restart.

It is therefore an object of this invention to asses a probability of an unexpected restart of the ECM precisely and prevent idle-stop operation control accordingly.

To achieve the above object, this invention provides an idle-stop operation control device that performs an idle-stop operation on a vehicle internal combustion engine, whereby an operation of the vehicle internal combustion engine is ceased in an idle operation state and an engine start-up operation is performed on the internal combustion engine from an operation-ceased state upon request by operating a starter motor using a power of a battery.

The device comprises a programmable controller that operates using a power supplied from the battery and is programmed to determine if the controller has experienced an unexpected restart in the course of the engine start-up operation and prevent the idle-stop operation from being executed on the internal combustion engine when the controller has experienced the unexpected restart in the course of the engine start-up operation.

The details as well as other features and advantages of this invention are set forth in the remainder of the specification and are shown in the accompanying drawings.

BRIEF DESCRIPTION OF THE DRAWINGS

FIGS. 3A-3E are timing charts showing an execution result of the idle-stop operation control routine when an unexpected restart has not occurred in the engine control module.

FIGS. 4A-4E are similar to FIGS. 3A-3E but shows an execution result of the idle-stop operation control routine when an unexpected restart has occurred in the engine control module.

DESCRIPTION OF THE PREFERRED EMBODIMENTS

Figure 1:
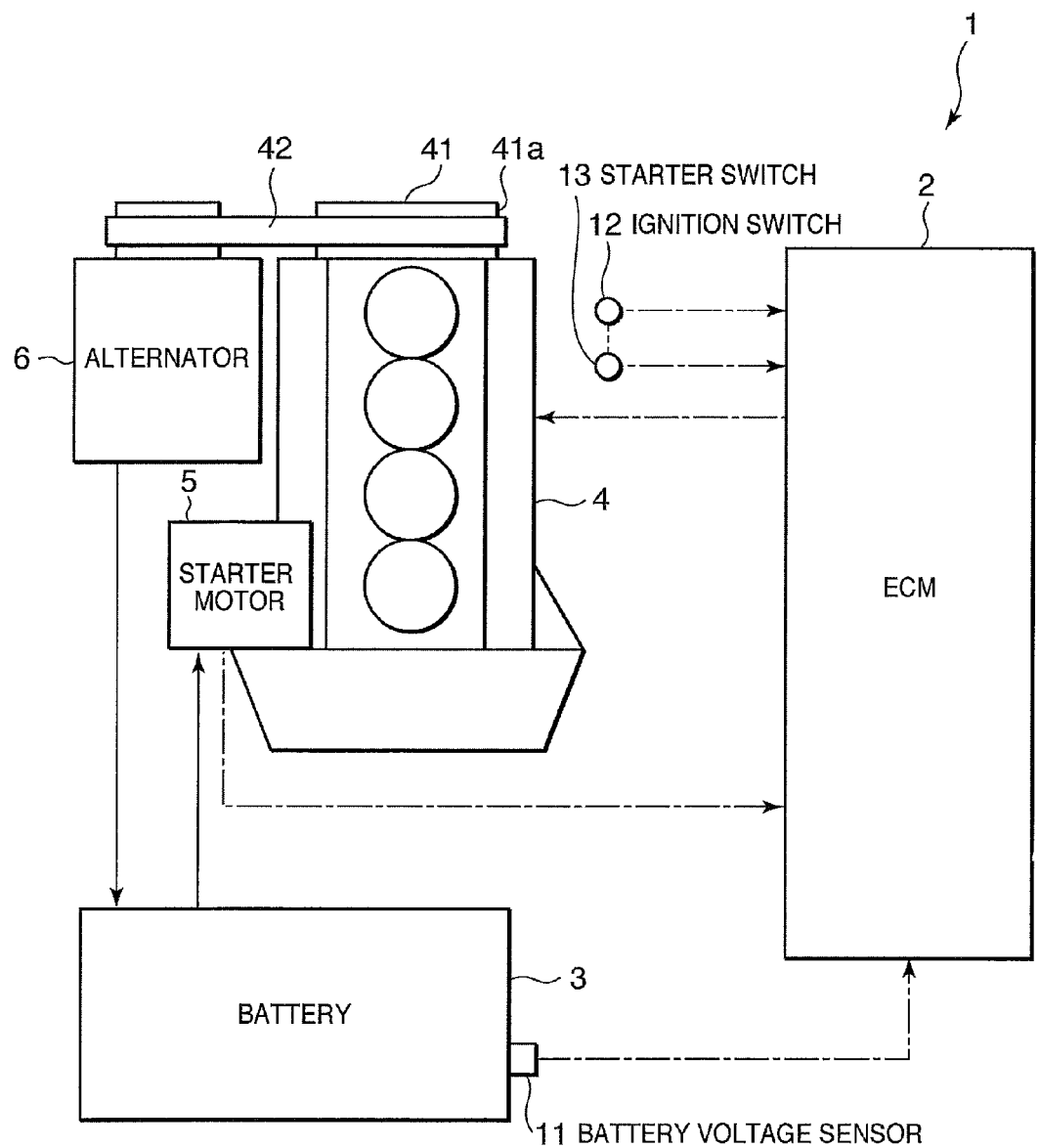
FIG. 1 is a schematic diagram of an idle-stop operation control device according to this invention.

Referring to FIG. 1 of the drawings, an internal combustion engine 4 for a vehicle, to which an idle-stop operation control device 1 according to this invention is applied, comprises an engine control module (ECM) 2, a battery 3, a starter motor 5, and an alternator 6.

The internal combustion engine 4 is an inline four-cylinder internal combustion engine. The internal combustion engine 4 may have a different number of cylinders or a different cylinder arrangement.

A crank pulley 41a is fixed to a tip of a crank shaft 41 of the internal combustion engine 4. The alternator 6 is driven by the crank pulley 41a via a belt 42 and generates an alternating-current power. The power generated by the alternator 6 is converted into a direct-current power. The direct-current power is supplied to accessories of the vehicle, and a residual power is used to charge the battery 3. When the power generated by the alternator 6 does not meet the power consumed by the accessories, the battery 3 supplies power to cover the deficit.

The internal combustion engine 4 is started by having the starter motor 5 crank the crank shaft 41 using the power supplied from the battery 3.

The vehicle comprises an ignition switch 12 that activates the accessories including the ECM 2 and a starter switch 13 that activates the starter motor 5 using power supplied from the battery 3. The starter switch 13 is turned ON only when the ignition switch 12 has been ON for a predetermined time period.

The ECM 2 is provided to control operations of the internal combustion engine 4. The ECM 2 operates using power supplied from the battery 3.

The ECM 2 is constituted by a microcomputer comprising a central processing unit (CPU), a read-only memory (ROM), a random access memory (RAM), and an input/output interface (I/O interface). The controller may be constituted by a plurality of microcomputers.

Signals indicative of a terminal voltage of the battery 3 are input into the ECM 2 from a battery voltage sensor 11. Signals showing that the starter motor 5 is operative are also input into the ECM 2 from the starter motor 5.

The battery 3 supplies the ECM 2 and the starter motor 5 with power. The battery 3 is charged using a part of a power generated by the alternator 6.

The ECM 2 executes idle-stop operation control of the internal combustion engine 4 as described below.

Specifically, when the terminal voltage of the battery 3 falls below a battery voltage drop determining value VB when the internal combustion engine 4 is started up by the starter motor 5, an idle-stop operation of the internal combustion engine 4 is thereafter prevented from being executed. The idle-stop operation denotes ceasing operation of the internal combustion engine 4 when it is in an idle operation state under certain conditions, and restarting the internal combustion engine 4 upon request.

The battery voltage drop determining value VB is a lower limit value of the terminal voltage of the battery 3 at which the ECM 2 does not restart. The battery voltage drop determining value VB is determined in advance considering a load and a deterioration of the battery 3. When the terminal voltage of the battery 3 is lower than the battery voltage drop determining value VB, there is a high probability that the ECM 2 will be restarted unexpectedly during a starting operation of the internal combustion engine 4 even if the ECM 2 does not undergo such an unexpected restart on the present occasion.

The unexpected restart of the ECM 2 can be caused even when the terminal voltage of the battery 3 is higher than the battery voltage drop determining value VB depending on other conditions. If the ECM 2 experiences the unexpected restart in the course of the starting operation performed on the internal combustion engine 4 by the starter motor 5, there is a high probability that the unexpected restart of the ECM 2 will occur again in the future when the internal combustion engine 4 starts to operate after the idle-stop operation.

The ECM 2 determines whether or not the ECM 2 has experienced the unexpected restart in the course of an engine start-up operation by the starter motor 5. If this determination is affirmative, the ECM 2 thereafter prevents the idle-stop operation of the internal combustion engine 4 from being executed until the ignition switch is turned OFF.

The determination as to whether or not the ECM 2 has experienced the unexpected restart in the course of the start-up operation performed on the engine by the starter motor 5 is made as described below.

Specifically, the ECM 2, when activated, first compares the terminal voltage of the battery 3 with an ECM restart determining value VA that is set higher than the battery voltage drop determining value VB. When the terminal voltage of the battery 3 is lower than the ECM restart determining value VA, the ECM 2 determines that the ECM 2 has experienced the unexpected restart in the course of engine start-up operation by the starter motor 5, and thereafter prevents the idle-stop operation of the internal combustion engine 4 from being executed.

Figure 2:
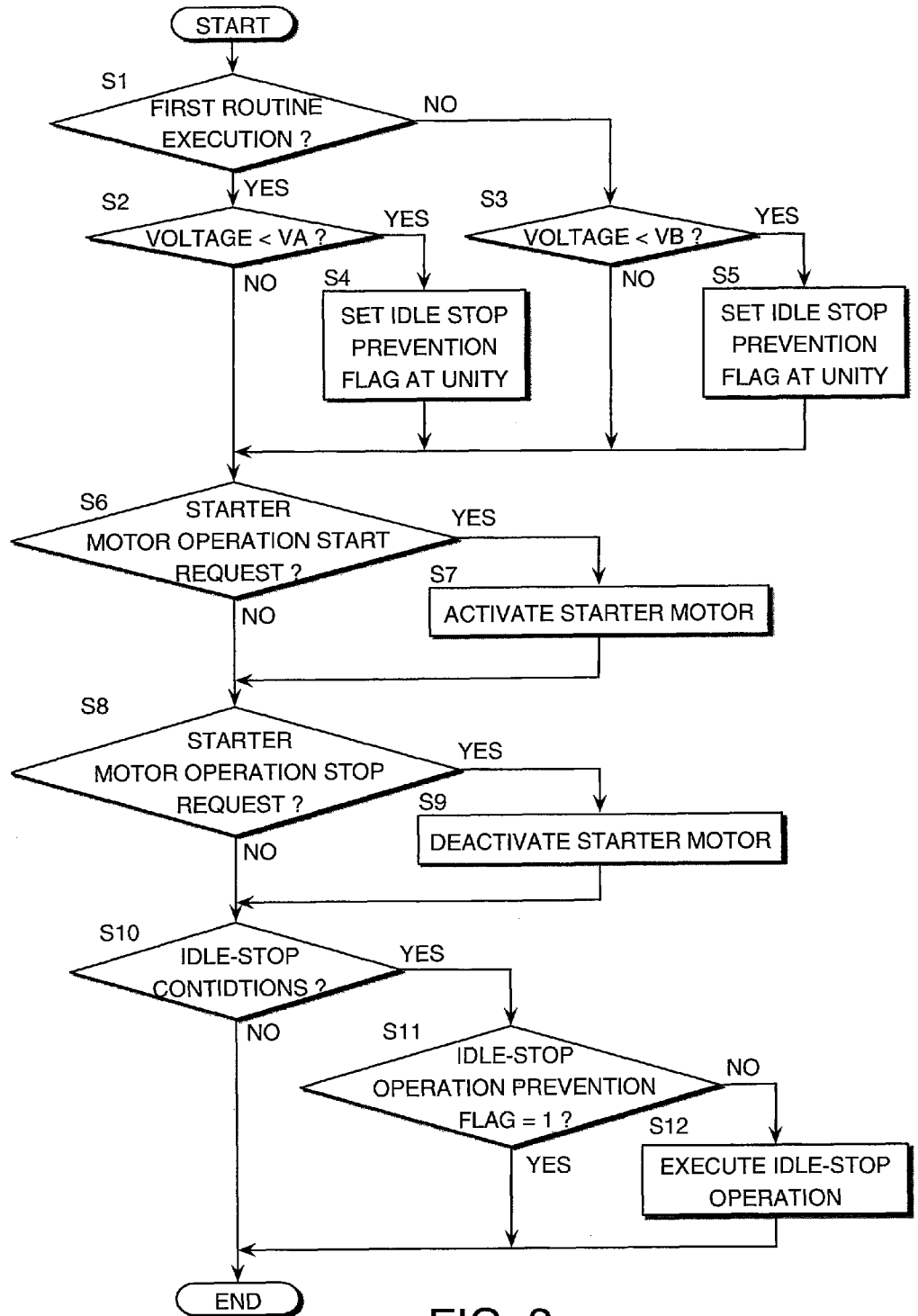
FIG. 2 is a flow chart describing an idle-stop operation control routine performed by an engine control module according to this invention.

Referring to FIG. 2, an idle-stop operation control routine performed by the ECM 2 for realizing the above idle-stop operation control of the internal combustion engine 4 will be described. This routine is repeatedly performed at constant intervals of, for example, ten milliseconds while the ECM 2 is active. The ECM 2 is activated as the ignition switch 12 is turned ON and deactivated as the ignition switch 12 is turned OFF. When the ECM 2 is deactivated, execution of this routine is terminated.

In a step S1, the ECM 2 determines if the present occasion corresponds to a first execution of the routine after the ECM 2 was activated. When the determination is affirmative, the ECM 2 performs the processing of a step S2. When the determination is negative, or in other words the present occasion corresponds to a second or later execution of the routine after the ECM 2 was activated, the ECM 2 performs the processing of a step S3.

The ECM 2 is activated as the ignition switch 12 is turned ON. At the moment when the starter switch 13 is turned ON, therefore, the ECM 2 is already operative. The determination of the step S1 becomes affirmative only immediately after the ECM 2 is activated by the ignition switch 12 or immediately after the ECM 2 restarts unexpectedly.

It should be noted that the ECM 2 being active means not only a state where hardware constituting the ECM 2 is active but also a state where the ECM 2 is ready to run a program such as a computation program stored therein.

In the step S2, the ECM 2 determines if the terminal voltage of the battery 3 is lower than the ECM restart determining value VA. When the terminal voltage of the battery 3 is lower than the ECM restart determining value VA, the ECM 2 determines that the ECM 2 has experienced the unexpected restart in the course of the engine start-up operation and proceeds to the processing of a step S4.

When the terminal voltage of the battery 3 is not lower than the ECM restart determining value VA, the ECM 2 proceeds to the processing of a step S6.

The ECM restart determining value VA is a threshold value of the terminal voltage of the battery 3 for determining if the present occasion corresponds to a timing immediately after the restart of the ECM due to a drop in the terminal voltage of the battery 3. As described above, the determination of the step S1 becomes affirmative only immediately after the ECM 2 is activated by the ignition switch 12 or immediately after the ECM 2 restarts unexpectedly.

By eliminating the first case, therefore, it is possible to determine that the present occasion corresponds to an occasion immediately after the unexpected restart of the ECM 2.

When the ECM 2 is activated by the ignition switch 12, the starter motor 5 is not yet activated. On this occasion, therefore, an instantaneous drop in the terminal voltage of the battery 3 due to power consumption by the starter motor 5 does not occur. When the ECM 2 is activated by the ignition switch 12, therefore, it is assumed that the terminal voltage of the battery 3 does not become lower than the ECM restart determining value VA. The ECM 2, by comparing the terminal voltage of the battery 3 with the ECM restart determining value VA, distinguishes between the unexpected restart of the ECM 2 and activation of the ECM 2 from the ignition switch 12.

The value of the ECM restart determining value VA differs according to the specifications of the ECM 2 and, therefore, is determined in advance through experiment.

In the step S4, the ECM 2 sets an idle-stop operation prevention flag at unity. When the ECM 2 has experienced the unexpected restart, it is highly probable that the ECM 2 will experience a further unexpected restart in the course of a subsequent start-up operation performed on the internal combustion engine 4 by the starter motor 5 after the idle-stop operation. By setting the idle-stop operation prevention flag at unity, the ECM 2 prevents subsequent idle-stop operations from being executed on the internal combustion engine 4. After the processing of the step S4, the ECM 2 proceeds to the processing of the step S6.

In the step S3, the ECM 2 determines if the terminal voltage of the battery 3 is lower than the battery voltage drop determining value VB.

If the terminal voltage of the battery 3 is lower than the battery voltage drop determining value VB in the step S3, the ECM 2 proceeds to the processing of a step S5. If the terminal voltage of the battery 3 is not lower than the battery voltage drop determining value VB, the ECM 2 proceeds to the processing of the step S6.

In the step S5, the ECM 2 sets the idle-stop operation prevention flag at unity. When the terminal voltage of the battery 3 is lower than the battery voltage drop determining value VB, it is highly probable that the ECM 2 will be caused to restart unexpectedly, and hence the idle-stop operation prevention flag is set at unity. After the processing of the step S5, the ECM 2 proceeds to the processing of the step S6.

In the step S6, the ECM 2 determines if an operation start request of the starter motor 5 has been issued in relation to the starter motor 5. The operation start request for the starter motor 5 is issued, for example, when an ON state of the ignition switch 12 has continued for a while or when a driver of the vehicle has released a brake pedal while the idle-stop operation is underway. If it is determined in the step S6 that the operation start request for the starter motor 5 has been issued, the ECM 2 proceeds to the processing of a step S7. If not, the ECM 2 proceeds to the processing of a step S8.

In the step S7, the ECM 2 causes the starter motor 5 to start operating. As a result, the starter motor 5 is supplied with power from the battery 3 to crank the internal combustion engine 4.

In the step S8, the ECM 2 determines if an operation stop request has been issued in relation to the starter motor 5. The operation stop request for the starter motor 5 is issued when cranking of the internal combustion engine 4 is complete. If the operation stop request for the starter motor 5 has been issued, the ECM 2 proceeds to the processing of a step S9. If the operation stop request for the starter motor 5 has not been issued, the ECM 2 proceeds to the processing of a step S10.

In the step S9, the ECM 2 stops operating the starter motor 5 by cutting the power supply to the starter motor 5 from the battery 3.

In the step S10, the ECM 2 determines if an idle-stop operation condition is satisfied. The idle-stop operation condition is satisfied when all of the following conditions are satisfied.

1) A rotation speed of the internal combustion engine 4 is maintained at an idling rotation speed for a predetermined period.

2) A cooling water temperature of the internal combustion engine 4 and a state of charge of the battery 3 are in predetermined sates, respectively.

3) An accelerator pedal of the vehicle is released.

If the idle-stop operation condition is satisfied, the ECM 2 proceeds to the processing of a step S11. If the idle-stop operation condition is not satisfied, the ECM 2 immediately terminates the routine.

In the step S11, the ECM 2 determines if the idle-stop operation is prohibited on the basis of the idle-stop operation prevention flag. If the idle-stop operation prevention flag is at unity, the idle-stop operation is prohibited. If the idle-stop operation is prohibited, the ECM 2 immediately terminates the routine.

If, on the other hand, the idle-stop operation is not prohibited, the ECM 2 executes the idle-stop operation on the internal combustion engine 4 in a step S12, and then terminates the routine.

Referring to FIGS. 3A-3E, idle-stop operation control performed by the idle-stop operation control routine in a case where the internal combustion engine 4 is caused to start up but the ECM 2 does not experience the unexpected restart due to an instantaneous drop in the terminal voltage of the battery 3 will be described.

At a time t1, the driver turns the ignition switch 12 ON from OFF and the ECM 2 is activated accordingly as shown in FIG. 3D. On the first occasion when the idle-stop operation control routine is executed, the determination of the step S1 in FIG. 2 is affirmative. Since an initial terminal voltage V of the battery 3 is higher than the ECM restart determining value VA as shown FIG. 3C, the determination in the step S2 of FIG. 2 is negative. In this state, since the operation start request for the starter motor 5 has not been issued and the idle-stop operation condition is not satisfied, the ECM 2 executes the processing of the steps S6, S8, and S10 and then terminates the idle-stop operation control routine.

On the next occasion when the idle-stop operation control routine is performed, the ECM 2 remains in an activated state, the operation start request for the starter motor 5 has not been issued, and the idle-stop operation condition is not satisfied. Accordingly, the ECM 2 executes the processing of the steps S1. S3, S6, S8, and S10 every time the idle-stop operation control routine is performed until the operation start request for the starter motor 5 is issued.

At a time t2, when the operation start request for the starter motor 5 is issued, the determination of the step S6 switches from negative to affirmative and the ECM 2 causes the starter motor 5 to start operating in the step S7. As a result, the starter motor 5 starts to operate, whereby cranking of the internal combustion engine 4 is begun.

When the starter motor 5 starts operating, the terminal voltage of the battery 3, which supplies the starter motor 5 with power, shows a rapid drop and falls below the battery voltage drop determining value VB. On the next occasion when the idle-stop operation control routine is executed, the determination of the step S1 is negative and the determination of the step S3 becomes affirmative. As a result, the idle-stop operation prevention flag is set at unity in the step S5.

This idle-stop operation control routine is not provided with a step that resets the idle-stop operation prevention flag to zero. The idle-stop operation prevention flag once set at unity is therefore maintained at unity until the ECM 2 is restarted.

The situation shown in FIGS. 3A-3E corresponds to a situation where the ECM 2 does not undergo the unexpected restart at the time t2 when the terminal voltage of the battery 3 falls below the battery voltage drop determining value VB as described above. In this situation, the terminal voltage of the battery 3, having fallen below the battery voltage drop determining value VB, recovers gradually as the operation of the starter motor 5 progresses, as shown in FIG. 3C.

During a period between the time t2 and a time t4, the ECM 2 executes the processing of the steps S1, S3, S5, S6, S8, and S10 every time the idle-stop operation control routine is performed as long as the terminal voltage of the battery 3 remains lower than the battery voltage drop determining value VB. When the terminal voltage of the battery 3 rises to or above the battery voltage drop determining value VB, the ECM 2 executes the processing of the step S1, S3, S6, S8, and S10 every time the idle-stop operation control routine is performed.

At the time t4, the operation stop request for the starter motor 5 is issued, The ECM 2 then cuts the power supply to the starter motor 5 from the battery 3 in the step S9 to stop the operation of the starter motor 5. As a result, the starter motor 5 stops operating and the terminal voltage of the battery 3 recovers to the initial voltage V, as shown in FIG. 3C.

During a period between the time t4 and a time t5, since the idle-stop operation prevention flag is maintained at unity, the idle-stop operation of the internal combustion engine 4 is not performed even when the idle-stop operation condition is satisfied in the step S10.

At the time t5, the driver turns the ignition switch 12 OFF from ON and the ECM 2 is deactivated accordingly. Accompanying the deactivation of the ECM 2, the idle-stop operation prevention flag stored in the memory of the ECM 2 is reset to zero.

Next, referring to FIGS. 4A-4E, idle-stop operation control performed by the idle-stop operation control routine in a case where the internal combustion engine 4 is caused to start running and the ECM 2 undergoes the unexpected restart due to an instantaneous drop in the terminal voltage of the battery 3 will be described.

The situation before the time t2 is identical to the situation shown in FIGS. 3A-3E. At the time t2, the idle-stop operation prevention flag is set at unity as in the situation shown in FIGS. 3A-3D. In the situation shown in FIGS. 4A-4D, however, the ECM 2 is caused to restart unexpectedly as shown in FIG. 4D due to a rapid drop in the terminal voltage of the battery 3. A considerable amount of time is required between the restart of the ECM 2 and resumption of the idle-stop operation control routine since the ECM 2 needs to read data stored in the ROM, for example, after the hardware of the ECM 2 is restarted. At a time t3, the ECM 2 performs the idle-stop operation control routine for the first time after the unexpected restart of the ECM 2.

The idle-stop operation control routine is configured to issue a start command to cause the starter motor 5 to start operating in the step S7, and to issue a stop command to cause the starter motor 5 to stop operating in the step S9. A drive circuit of the starter motor 5 is configured to continue operation of the starter motor 5 during a period between the starting operating of the starter motor 5 upon receiving the start command and the stopping operation of the starter motor 5 upon receiving the stop command, irrespective of the restart of the ECM 2.

Due to the unexpected restart of the ECM 2, the idle-stop operation prevention flag is reset to zero as shown in FIG. 4E. After the restart of the ECM 2, the idle-stop operation prevention flag is at zero in the first performance of the idle-stop operation control routine at the time t3.

At the time t3, the terminal voltage of the battery 3 returns to a value between the battery voltage drop determining value VB and the ECM restart determining value VA as shown in FIG. 4C.

When the ECM 2 performs the idle-stop operation control routine at the time t3 for the first time after the unexpected restart, the determinations of the steps S1 and S2 become affirmative. The idle-stop operation prevention flag is therefore set at unity in the step S4. In this state, since neither the operation start request nor the operation stop request has been issued and the idle-stop operation condition is not satisfied, the ECM 2 executes only the determinations of the steps S6, S8, and S10 of the idle-stop operation control routine.

On the next occasion when the idle-stop operation control routine is performed, the determination in the step S1 switches from affirmative to negative. As a result, the determination in the step S3 is executed instead of the determination in the step S2. Since the terminal voltage of the battery 3 is higher than the battery voltage drop determining value VB, the determination in the step S3 is negative. However, since the idle-stop operation control routine does not have a step to reset the idle-stop operation prevention flag, the idle-stop operation prevention flag is maintained at unity. The idle-stop operation control routine is terminated after performing the determinations of the steps S6, S8, and S10.

In every performance of the idle-stop operation control routine, the same processing is executed until the time t4 is reached.

The processing executed by the idle-stop operation control routine after the time t4 is identical to that of the FIGS. 3A-3E.

As described above, the ECM 2 of this idle-stop operation control device 1 replaces the battery voltage drop determining value VB with the ECM restart determining value VA, which is higher than the battery voltage drop determining value VB, as a determining value for determining whether or not the idle-stop operation prevention flag is to be set at unity, only immediately after the unexpected restart of the ECM 2.

Further, when the terminal voltage of the battery 3 is lower than the ECM restart determining value VA immediately after the unexpected restart of the ECM 2, the ECM 2 determines that the ECM 2 has experienced the unexpected restart due to a drop in the terminal voltage of the battery 3 during the engine start-up operation performed by the starter motor 5 and sets the idle-stop operation prevention flag at unity.

If the battery voltage drop determining value VB was set at a higher value, the number of occasions when the idle-stop operation is prevented would increase unnecessarily. By preventing the idle-stop operation after the unexpected restart of the ECM 2 during the engine start-up operation by the starter motor 5, start failure of the internal combustion engine 4 from the idle-stop operation can be prevented from occurring without setting the battery voltage drop determining value VB at a higher value.

When the ECM 2 restarts in a state where the idle-stop operation is prohibited, the idle-stop operation prevention flag is reset to zero. However, since the ECM 2 determines whether or not the idle-stop operation should be prevented on the basis of the ECM restart determining value VA during the first performance of the idle-stop operation control routine after the restart of the ECM 2, the idle-stop operation is substantially prohibited continuously even in conditions where the unexpected restart frequently occurs in the ECM 2.

Further, according to this idle-stop operation control device 1, the determination as to whether or not the ECM 2 has experienced the unexpected restart is performed on the basis of the terminal voltage battery 3 immediately after activation of the ECM 2. Owing to this algorithm, a distinction can be made between the unexpected restart of the ECM 2 due to a drop in the terminal voltage of the battery 3 and normal activation of the ECM 2 by the ignition switch 12 with high precision. Since this distinction is made only on the basis of the terminal voltage of the battery 3, a precise distinction result is obtained at low cost through a simple process.

The contents of Tokugan 2010-015177, with a filing date of Jan. 27, 2010 in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

For example, in the embodiment described above, the terminal voltage of the battery 3 is compared with the ECM restart determining value VA only immediately after activation of the ECM 2 in order to distinguish between the unexpected restart of the ECM 2 and activation of the ECM 2 by the ignition switch 12, On the basis of this distinction, when the ECM 2 has experienced the unexpected restart, the idle-stop operation prevention flag, which has been reset to zero due to the unexpected restart of the ECM 2, is set at unity again.

However, if the idle-stop operation control device is provided with a non-volatile memory, it is possible to store the terminal voltage of the battery 3 continuously and set the idle-stop operation prevention flag in relation to the stored terminal voltage of the battery 3. Even when the ECM 2 undergoes the unexpected restart, the terminal voltage of the battery 3 in the non-volatile memory can be restored and compared with the battery voltage drop determining value VB to determine whether or not the idle-stop operation prevention flag should be set at unity.

The embodiments of this invention in which an exclusive property or privilege is claimed are defined as follows:

What is claimed is:

1. An idle-stop operation control device that performs an idle-stop operation on a vehicle internal combustion engine, whereby an operation of the vehicle internal combustion engine is ceased in an idle operation state and an engine start-up operation is performed on the internal combustion engine from an operation-ceased state upon request by operating a starter motor using a power of a battery, the device comprising:
   a sensor configured to detect a terminal voltage of the battery; and
   a programmable controller that operates using a power supplied from the battery, the programmable controller being programmed to:
      determine if the controller is in a condition immediately after activation;
      determine that the controller has experienced a shutdown and restart in the course of the engine start-up operation when the controller is in a condition immediately after activation and the terminal voltage of the battery is lower than a restart determining value; and
      prevent the idle-stop operation from being executed on the internal combustion engine when the controller has experienced the shutdown and restart in the course of the engine start-up operation.

2. The idle-stop operation control device as defined in claim 1, wherein the controller is further programmed to compare the terminal voltage with a battery voltage drop determining value that is lower than the restart determining value when the controller has not experienced the shutdown and restart in the course of the engine start-up operation, and prevent the idle-stop operation of the internal combustion engine from being executed when the terminal voltage of the battery is lower than the battery voltage drop determining value.

3. The idle-stop operation control device as defined in claim 2, wherein the controller is further programmed to prevent the idle-stop operation by setting an idle-stop operation prevention flag that is reset when the controller is restarted.

4. The idle-stop operation control device as defined in claim 1, wherein the controller is further programmed to prevent the idle-stop operation by setting an idle-stop operation prevention flag that is reset when the controller is restarted.

5. The idle-stop operation control device as defined in claim 1, wherein the vehicle comprises an ignition switch that activates the controller and a starter switch that activates the starter motor in order to crank the internal combustion engine to start up in a state where the ignition switch is turned ON.

6. An idle-stop operation control device comprising a controller that performs an idle-stop operation of a vehicle internal combustion engine, whereby an operation of the internal combustion engine is ceased in an idle operation state and an engine start-up operation is performed on the internal combustion engine from an operation-ceased state upon request by operating a starter motor using a power of a battery, the device comprising:
   means for detecting a terminal voltage of the battery;
   means for determining that the controller has experienced a shutdown and restart in the course of the engine start-up operation when the controller is in a condition immediately after activation and the terminal voltage of the battery is lower than a restart determining value; and
   means for preventing the controller from performing the idle-stop operation on the internal combustion engine when the controller has experienced the unexpected shutdown and restart in the course of the engine start-up operation.

7. An idle-stop operation control device that performs an idle-stop operation on a vehicle internal combustion engine, whereby an operation of the vehicle internal combustion engine is ceased in an idle operation state and an engine start-up operation is performed on the internal combustion engine from an operation-ceased state upon request by operating a starter motor using a power of a battery, the device comprising:
   a sensor configured to detect a terminal voltage of the battery; and
   a programmable controller that operates using a power supplied from the battery, the programmable controller being programmed to prevent the idle-stop operation from being executed on the internal combustion engine when the terminal voltage of the battery is lower than a restart determining value at a time immediately after activation of the controller.

8. An idle-stop operation control method for performing an idle-stop operation of a vehicle internal combustion engine, whereby an operation of the internal combustion engine is ceased in an idle operation state and an engine start-up operation is performed on the internal combustion engine from an operation-ceased state upon request by operating a starter motor using a power of a battery, the method comprising:
   detecting a terminal voltage of the battery;
   determining that the controller has experienced a shutdown and restart in the course of the engine start-up operation when the controller is in a condition immediately after activation and the terminal voltage of the battery is lower than a restart determining value; and
   preventing the controller from performing the idle-stop operation on the internal combustion engine when the controller has experienced the shutdown and restart in the course of the engine start-up operation.

* * * * *